(12) United States Patent  
Kaukoniemi et al.

(10) Patent No.: US 8,182,580 B2  
(45) Date of Patent: May 22, 2012

(54) FILTER STRUCTURE FOR FILTERING A PARTICLE-CONTAINING GAS, METHOD OF ITS MANUFACTURE AND USE OF POROUS PAPER

(75) Inventors: Otto-Ville Kaukoniemi, Helsinki (FI); Kaisa Lehtinen, Vantaa (FI); Harri Kosonen, Lohja (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 724 days.

(21) Appl. No.: 12/301,202

(22) PCT Filed: May 11, 2007

(86) PCT No.: PCT/FI2007/050268
§ 371 (c)(1),
(2), (4) Date: Feb. 24, 2009

(87) PCT Pub. No.: WO2007/135232
PCT Pub. Date: Nov. 29, 2007

(65) Prior Publication Data
US 2009/0241777 A1      Oct. 1, 2009

(30) Foreign Application Priority Data

May 18, 2006   (FI) ...................................... 20065338

(51) Int. Cl.
*B03C 3/64*   (2006.01)
(52) U.S. Cl. .................. 95/59; 55/DIG. 5; 96/66; 96/69; 96/96; 264/480; 264/DIG. 48
(58) Field of Classification Search .......... 95/59; 96/66, 96/69, 96; 55/DIG. 5; 264/479, 480, DIG. 48
See application file for complete search history.

(56) References Cited

U.S. PATENT DOCUMENTS

| 4,323,374 A |   | 4/1982 | Shinagawa et al. |
| 5,108,470 A | * | 4/1992 | Pick ................................. 96/58 |
| 5,268,009 A |   | 12/1993 | Thompson et al. |
| 5,368,635 A |   | 11/1994 | Yamamoto |
| 5,474,600 A | * | 12/1995 | Volodina et al. .................. 96/57 |

(Continued)

FOREIGN PATENT DOCUMENTS

DE            299 24 500 U1     7/2003

(Continued)

OTHER PUBLICATIONS

Brown R.C. et al. "An electrically augmented filter made from conducting and dielectric fibres", Journal of Electrostatics 1994, vol. 33, pp. 393-412.

(Continued)

*Primary Examiner* — Richard L Chiesa
(74) *Attorney, Agent, or Firm* — Birch, Stewart, Kolasch & Birch, LLP

(57) ABSTRACT

The invention relates to a novel gas filter structure, a filtering method and a method of producing the filter structure. The structure according to the invention includes a planar, porous isolation material layer (12) having two opposing surfaces. According to the invention both surfaces of the isolation material layer (12) include comprise a porous conductive layer (14, 16) including a porous filtering matrix treated with a conductive material. The conductive material consists of a material different from the support matrix. By use of the conductive layers it is possible to create in the isolation material an electric field that considerably improves the filtering efficiency of the isolation material, especially for small particles.

28 Claims, 1 Drawing Sheet

U.S. PATENT DOCUMENTS

Figure 1:
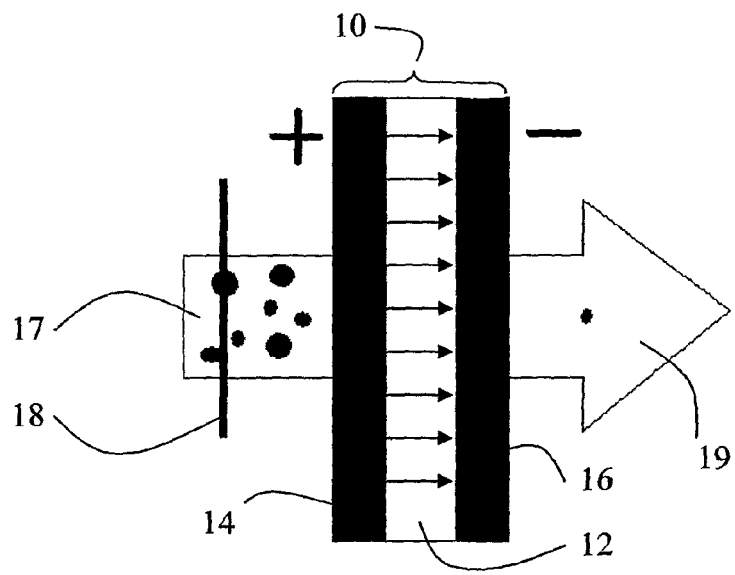

| | | | |
|---|---|---|---|
| 6,245,126 B1* | 6/2001 | Feldman et al. | 95/59 |
| 6,251,171 B1* | 6/2001 | Marra et al. | 96/69 |
| 6,514,325 B2 | 2/2003 | Cox et al. | |
| 6,527,834 B1 | 3/2003 | Jorder et al. | |
| 6,596,109 B2 | 7/2003 | Posa et al. | |
| 6,627,563 B1 | 9/2003 | Huberty | |
| 6,764,533 B2* | 7/2004 | Lobiondo, Jr. | 96/66 |
| 7,258,729 B1* | 8/2007 | Barsimanto et al. | 96/66 |
| 7,594,959 B2* | 9/2009 | Nutsos | 96/69 |
| 2002/0083837 A1 | 7/2002 | Doherty | |
| 2003/0000389 A1 | 1/2003 | Schultheiss et al. | |
| 2004/0011204 A1 | 1/2004 | Both | |
| 2006/0060085 A1 | 3/2006 | Ptak et al. | |
| 2007/0137486 A1* | 6/2007 | Bergeron et al. | 96/66 |

FOREIGN PATENT DOCUMENTS

| | | | |
|---|---|---|---|
| GB | 2 149 686 A | | 6/1985 |
| GB | 2 329 598 A | | 3/1999 |
| JP | 54-162277 A | * | 12/1979 |
| JP | 62042715 A | | 2/1987 |
| JP | 4-63865 A | | 2/1992 |
| JP | 7-16411 A | | 1/1995 |
| JP | 9-173894 A | | 7/1997 |
| JP | 10-317851 A | | 12/1998 |
| JP | 2000-153115 A | | 6/2000 |
| JP | 2002-18217 A | | 1/2002 |
| JP | 2002-316010 A2 | | 10/2002 |
| JP | 2004-17000 A | | 1/2004 |
| JP | 2006-61830 A | | 3/2006 |
| WO | WO-94/03276 A1 | | 2/1994 |
| WO | WO-98/22222 A1 | | 5/1998 |
| WO | WO-02/074416 A1 | | 9/2002 |
| WO | WO-2004/096413 A1 | | 11/2004 |
| WO | WO-2005/061115 A1 | | 7/2005 |

OTHER PUBLICATIONS

Gregersen Oyvind W., The 2004 Progress in Paper Physics Seminar Jun. 21-24, 2004, pp. 100-103.

* cited by examiner

FILTER STRUCTURE FOR FILTERING A PARTICLE-CONTAINING GAS, METHOD OF ITS MANUFACTURE AND USE OF POROUS PAPER

The present invention relates to gas filters. The invention relates especially to air filters, into which an electric voltage is directed for improving the filtering efficiency. In such an air filter the electric field guides the charged particles into the filter material. The invention additionally relates to a method for filtering gas, a method of producing the separation part of the gas filter and a novel use of paper.

A simple air filter consists of fiber material allowing air through it but catching dust particles and small particles entrained with air into the fiber matrix. The filtering efficiency of such air filters is, however, weak, especially at the early stage of filter use, when the material is not clogged at all or it has only collected a small amount of particles. As the material becomes more clogged, the filtering efficiency improves, but simultaneously the flow resistance increases. Especially with very small particles, less than 2 μm in size, efficient filtering is difficult to achieve with simple fiber materials. On the other hand, in case the density of the fiber is increased, flow resistance quickly increases.

One type of a more efficient air filter paper is disclosed in DE publication 29924500. The publication discloses a filter layer and tissue cover superimposed so that the air flow enters from the direction of the tissue cover. The tissue cover can consist of thermally bound fibers or dry-laid or wet-laid fiber material. The filtering layer can consist of paper or blow-treated or melt-treated fibers.

The problem with the above-mentioned filters is, however, their fire safety. The fibers can easily accumulate static electricity, which can then be discharged as sparks. In this case dust accumulated in the filter can catch fire. U.S. Pat. No. 6,527,834 discloses a filter material in which a net-like, electrically conductive coating has been arranged on the second surface of the filter layer made of, e.g. paper, by means of carbon black for preventing accumulation of electricity. The coating can also extend into the filter layer either fully or partly. Such an antistatic coating causes the electric charges accumulated in the filter to quickly discharge. Thus die material does not spark and ignite dust accumulated thereon.

Traditionally, the separation portion of an electric air filter comprises metal plates arranged parallel with the air flow, whereby an electric field between the plates deflects the path of the particles entrained with the air. Thus the particles are captured by the charged plates. An advantage of such filters is that they can easily be cleaned after they've become clogged, but they are, on the other hand, too large and expensive to be used in a number of applications, such as air filtration systems of cars.

So-called electret filters are also known, the filtering effect of which is based on the electrostatic charge of electrically non-conducting electret fibers in the filter material. The fibers of the electret filter separate dust particles in two different ways: the particles are caught by the filter structure of the filter either mechanically or the electret fibers of the filter attract them due to the electric charge. Polypropylene, for example, can be used as the electret material. The charge state of the electret filters is, however, discharged over time, whereby the small additional efficiency of electricity is lost.

One electret filter is disclosed in JP publication 2004/017000. The filter material described therein has an antibacterial effect. The filter material consists of fiber cloth containing electret fibers, a reinforcement layer and fiber cloth containing antibacterial material, which are laminated together.

JP publication 2002/018217 discloses an electret filter meant to maintain a good filtering effect also as the electret effect is reduced. The solution is in practice to add a second, mechanically well filtering filter layer over the electret layer. A similar type of solution comprising a pre-filter and en electret filter is also disclosed in JP publication 2002/316010 and US publication 2003/0000389. In the structure shown in US publication 2002/0083837 a wet-laid fiber material layer and a dry-laid, electrically charged fiber material layer are arranged superimposed with glue for producing an efficient filter.

JP publication 2000/153115 discloses a multi-layer filter having an electret layer and an odor removing layer formed into a honeycomb-like structure. The filter additionally comprises antibacterial material and a photo catalyst of semiconductor type for causing the odor removal and poisoning of bacteria.

US publication 2004/0011204 discloses one type of electret filter and a method of manufacturing it. The filter comprises a fiber web formed of electrically charged fibers. The fibers are connected to each other by means of ultrasound at certain points of the web for assisting in folding the web.

Electret fiber materials can also be grounded, as has been shown, for example, U.S. Pat. No. 5,268,009.

The electric field caused by the electret fibers deflecting the charged particles is weak, whereby their usefulness is relatively limited. Using electret fibers for improving the filtering efficiency of filter papers is expensive as well and it is difficult to carry out from a manufacturing technical point of view in large scale. This is due to the fact that such fibers are usually synthetic and their production and modifying into a structure having preferable filtering properties is cumbersome and often requires the use of plastic industry processes. Including them into the traditional filter fiber matrices is also difficult. Further, using synthetic fibers causes a significant environmental load.

WO publication 2005/061115 describes a filtering apparatus comprising a fiber filter. The apparatus comprises a metallic earth electrode connected to the rear surface of the filter for removing the charge accumulated into the filter. On the front side of the filter there is another, grid-like electrode connected to voltage. The voltage creates an electric field between the electrodes, the field polarizing the fibers of the filter for enhancing the operation of the filter. The aim is to provide a homogenous electric field in the region of the filter; whereby the grid-like electrode must be taken far away from the second electrode. Thus it is located at a distance from the filter, which makes for a voluminous structure.

The aim of the invention is to provide a new, less voluminous filter structure. An especial aim of the invention is to provide a small structure, by means of which especially the separation accuracy of small particles can be improved and the manufacture of which is simple in a large scale.

It is another aim of the invention to provide a method for manufacturing such a filter structure.

The aim of the invention is also to provide a novel use for a paper product.

The invention is based on the idea that both sides of a porous (air permeable) isolating layer are provided with porous layers treated so as to be electrically conductive. Thus, both sides of the isolating layer comprise an air permeable, but uniformly conductive material structure. Here, these surface layers are called conductive layers. An electrical field can be formed inside the isolation layer. An electrical field can be created inside the isolation layer by arranging a voltage between the conductive layers. We have noticed that an electrical field formed though the isolation layer by means of the described structure greatly improves the filtering efficiency of the filter.

The conductive layers can be formed by layering electrically conductive porous layers on both sides of the porous isolation substrate. The layering must be carried out so that the air permeability of the product is maintained and the conductive layers of the surfaces are not brought into electrical contact with each other. Thus, the final filter material forms a capacitor-like structure in which the various layers are preferably fixedly attached to each other.

The simultaneous electrical conductivity and air permeability can typically be achieved by treating a suitable porous support matrix (such as single fibers of a fiber matrix) with a conductive material. Generally speaking, by porous support matrix we mean a material structure producing a gas permeable structure into the conductive layers and it usually forms a net-like gripping surface for the conductive material. Such a support matrix can be considered to be treated so as to be electrically conductive, when an essentially uniform electrically conductive structure is formed on the surface of its pores. Further, the support matrix and conductive material are usually different materials; the support matrix can be, for example, paper and the conductive material can be a polymer bound to the surface of the fibers of the paper. Other support matrix and conductive material alternatives are described later, as well as other methods for creating the electrical conductivity of the conductive layers. Such a structure forms a layer both well air-permeable and sufficiently electrically conductive. It further offers a possibility to separately influence air permeability and conductivity.

The electric field to be formed in the isolation layer (centre layer) deflects the path of the charged particles going through it, whereby the particles are caught by the fibers of the material. Thus, a considerable increase in particle separation efficiency is achieved, especially if the particles are provided with an electric charge by means of, for example, a corona wire prior to directing them into the filter material.

The porous isolation layer is preferably a fiber layer. It can be made of cellulose fibers or another isolating fiber material, such as glass fibers. A porous isolation layer generally functions as a primary filtering layer. The porous conductive layers are primarily used for creating an electric field, but they can also possess a secondary filtering effect. In addition to fiber materials, open-cell cell materials and ceramic materials can especially be used as substrate for the conductive layers.

Thus, the metal plates arranged parallel with the gas flow, used in traditional electrical filters can be replaced by an electrically chargeable multi-layer structure installed, for example, perpendicularly to the gas flow. In a typical solution the porous isolation layer is of a paper grade suitable for filtering air, but also other ones, especially layers made of natural fibers or for example glass fiber materials, can be used.

In a method according to the invention for filtering gas, particle-containing gas is directed through the first porous conductive layer into a porous isolation material layer and further through another porous conductive layer so that in the isolation material layer the particles are subjected to an electric field created between the first and second porous conductive layer for directing the charged particles into the isolation material.

Considerable advantages can be achieved by means of the invention. The invention makes it possible to manufacture air filters in a new way, saving space. The invention also makes it possible to utilize electric filtering in new applications. Compared with the separation portion of a traditional electrical air filter, the small space requirement and use of natural materials can be included among the advantages of the invention. Present filters are mainly made of metal. In an exemplary paper-based solution shown here the separation area is very large, due to the porous nature of the paper. Thus it is possible to achieve a very high separation efficiency in relation to the pressure loss occurring in the filter.

The filtering layer of a filter according to the invention can be made almost wholly of natural fibers, whereby it is environmentally friendly and recyclable. Thus, a high separation efficiency is achieved, such as has previously only been achievable only by means electret materials or metallic separators. Natural materials, such as biodegradable polymers, can be used in the conductive layers as well. The filter material can be produced in bulk by means of, for example, a paper machine, in an online process by layering non-conductive and conductively treated paper grades for forming a tri-layer structure.

The invention also solves the problem of sparking caused by triboelectricity (e.g. abrasion electricity). This is because the conductive surface layers prevent large external electric fields charging the isolation material from entering the isolation layer and the residual charges accumulated in the surface layers can easily be discharged. Thus the filter is safe to use.

The filter according to the invention can be used for replacing the filter component used in current mechanical electromechanical filter systems. In case of mechanical systems a suitable voltage source or transformer must be arranged for the filter. The invention makes it possible to use electrical filtering with a high separation efficiency even in applications where it has not previously been used due to the large volume requirements or high costs. Among examples of such applications can be mentioned, among others, automotive air filters, automotive indoor ventilation air filters, vacuum cleaner filters and indoor air filters in city conditions.

A number of various raw materials can be used in production of the filter material. This applies both to the isolation layer and the conductive layers. Especially fiber technical production methods for manufacturing the fiber material, forming the electrical conductivity of the fiber, as well as for modifying the mechanical properties of the fiber are suitable for use in the manufacture of such a filter material.

When compared to current metal plate filters the filter according to the invention usually causes a larger pressure loss as the air flow passes through the filter material. However, in relation to a number of currently usual fiber filters and electret filters the filter according to the invention can be made less dense, thus causing a smaller pressure loss, while maintaining a good filtering efficiency. Especially a filter made of paper material is also disposable, unlike currently used metal plate solutions, because it is not possible to fully clean it, but the particles stay permanently in the filtering matrix. Due to the low production costs of the filter and because natural products can be used in the filter, disposability is not a problem.

Figure 2:
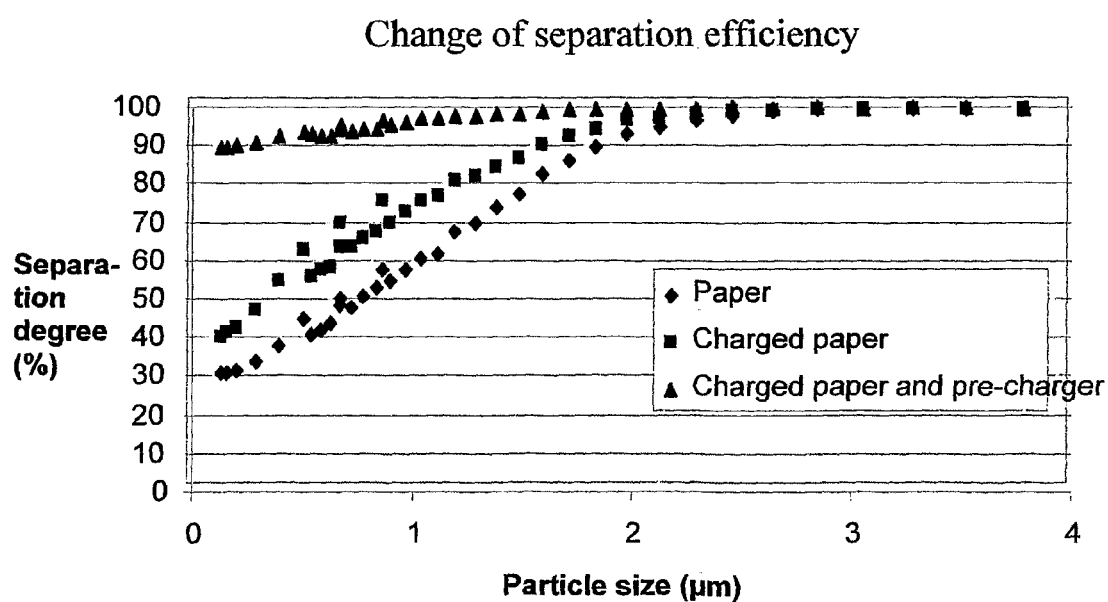

In the following, the various embodiments of the invention are examined in more detail with reference to the appended drawings. In the drawings FIG. 1 illustrates the structure and operation principle of the electric filter, and FIG. 2 is a graph of the separation efficiency of the electric filter (filtering voltage 1.5 V) as a function of the particle size without a pre-charger and when using a corona wire as a pre-charger.

In the following, reference is made to FIG. 1 exemplifying the filter structure according to one embodiment of the invention. The filter material comprises a multi-layer structure 10 having a fibrous isolation layer 12, both sides of which comprise surface layers 14 and 16. The surface layers 14 and 16 comprise a fibrous support matrix treated with an electrically conductive polymer so that it has become electrically conductive. The fiber layer 12 can be, for example, paper, but generally it can comprise cellulosic material produced from lignocellulose-containing material, especially wood or annual or perennial plants. The material can be wood-containing or woodless and it can be made of mechanical, semi-mechanical (chemimechanical) or chemical pulp or a mixture thereof.

The pulp can be bleached or unbleached. The material can also comprise recycled fibers, especially recycled paper or board. Other suitable fiber materials include glass fiber and woven or non-woven fabrics.

The volume density of the fiber layer 12 is typically 3-30%, with glass fiber products typically 3-20% and with papers typically 5-30%. Especially with wood fiber papers the volume portion can in some cases be more than 20%. According to the separation grade the fiber can be used as layers, the surface area mass of which is 30-500 g/m$^2$, typically, however, less than 200 g/m$^2$. A thinner fiber layer typically causes a smaller pressure loss, but on the other hand, in a thick layer the electric field effects on the particles for a longer time, whereby the electric field can be more efficiently utilized. Breakdown voltage also increases as the distance between conductive layers increases.

The fiber layer 12 is porous in structure. This means that it is air permeable and can bind particles that are passing through it entrained with air into its fibers. Thus it typically includes at least air channels uniform in the thickness direction of the layer. Usually the fiber materials are porous to considerable degree in the direction of the surface as well. In FIG. 1, particle-containing air or other gas is marked by reference number 17 and filtered air is marked by reference number 19. A cord wire is marked by reference number 18. In one embodiment, prior to directing the gas 17 into the isolation material, the particles entrained therewith are charged by means of a pre-charger, such as a cord wire 18. The mechanical separation degree (separation degree without the electric field) of the fiber layer 12 for 1 μm particles is usually 20-99%, preferably 40-80%, typically at least 50%.

According to one embodiment an isolation material, well air permeable, is used, having a relatively low mechanical filtering capability, such as 50-80% for 1 μm particles. By means of the electric field the filtering capability can be correspondingly increased to, for example, 90-100%. Thus, both a good filtering capability and a low pressure loss are achieved in the filter.

Suitable porous filter materials are air filter papers used as such, rough papers (industrial papers) and, for example, cellulose cotton products, tissue papers and crepé papers. According to one embodiment the porous isolation layer 12 is formed by a single layer, but within the invention multi-layer porous isolation materials, especially multi-layer papers and boards, are possible as well. Thus the isolation material layer 12 can comprise, for example, two or more fiber layers glued or otherwise bound to each other. Most preferably used arrangement is one in which the adhesion between the fiber layers alone is sufficient for binding the layers to each other. In case glue is used, it is applied as a porous micro or macro level layer. By macro level porosity we mean gas permeable layers applied, for example, in a net-like, stripe-like or dot-like, i.e. non-continuous, manner. The fiber layer 12 can also be reinforced before applying the conductive layers, such as with a reinforcing material typically wet applied to one or both sides of the fiber layer. Reinforcing materials, such as resin, can also be impregnated into the fiber matrix. In all embodiments the thickness of layer 12 does not need to be as large as when using it alone, because the conductive layers arranged on its layers typically increase the thickness of the final product.

According to one embodiment the isolation layer 12 is free of synthetic electret fibers, especially polyester. Thus the fiber layer 12 does not accumulate electrostatic charges. This does not, however, exclude electric polarization of fibers caused by the electric field, which binds charged particles to the fibers.

The support matrix of the conductive layers can consist of materials of same type as the isolation layer. Thus it can, for example, be of natural fiber, glass fiber, or e.g. of woven or non-woven fabric.

The distance between the conductive layers 14, 16 (thickness of the isolation material layer 12) is typically about 0.01-4 mm, preferably 0.05-2 mm, especially about 0.1-1 mm. A planar isolation substrate 12 causes the conductive layers to be automatically parallel and the distance between them is essentially constant (deviations in the micrometer class can, of course, occur due to the surface roughness of the substrate).

The volume resistivity of the conductive layers 14, 16 is preferably less than $10^{10}$ Ωcm. In order to evenly utilize the whole surface area of the filter it is also preferable to have the substance so distributed in the layers 14, 16 that the charge carriers can evenly move in the layers so that in the macro level they form an essentially homogenous field strength and field pattern inside the isolation 12. However, especially in the vicinity of the layers 14, 16 the shape of the field can vary due to the porosity of the structure.

The air permeability of the whole filter structure 10 can vary within a very large range, but typically it is at least 100-8000 l/(m$^2$s), preferably at least 1000 l/(m$^2$s). In practical applications the pressure loss caused by the filter is typically less than 400 Pa, preferably less than 100 Pa, even less than 60 Pa.

The porous conductive layers 14, 16 of the multi-layer structure 10 can be produced in a number of ways. Materials suitable for achieving conductivity in all methods are, for example, metal particles, carbon black and conductive polymers, such as polyaniline, polypyrrole, polyacetylene, polytiophen and polyparaphenylene and their derivatives and mixtures. As examples of derivatives can be mentioned aryl and alkyl derivatives and chlorine and bromide substituted derivatives of the above-mentioned polymers. In order to adjust the conductivity doping or dedoping materials can be used. Usually a polymer is considered electrically conductive if its resistivity is at maximum $10^{11}$ Ω (surface resistivity). The conductive material typically comprises 1-30% of the total weight of the conductive layer. The mass portion of the support matrix is usually 70-99%. The conductive layers can additionally comprise additives, such as pigments or reinforcing materials. Of conductive materials, the advantage of polymers and carbon black is that the conductive layers can be nonmetallic.

Below is a description of various techniques for forming the multilayer structure and for binding the conductive material into the support matrix of the conductive layers.

In layering method the porous layers are mechanically joined to each other by means of the natural adhesion of the fibers or by means of, for example, glue for producing a multilayer structure 10. Preferably all porous layers 12, 14, 16 are formed of fiber material, such as paper, and the outermost layers 14, 16 are chemically treated so as to be conductive.

According to one embodiment the conductive fiber layers 14, 16 are formed mixed by mixing conductive polymer into the fiber pulp, usually as an aqueous dispersion. Binder is often additionally used for enhancing the binding of the polymer into the fibers. Thus the polymer is bound into the fibers (the surface of pores) of the matrix formed of the pulp so that it forms a network-like electrical connection between the fibers while maintaining porosity. In the conductive layer the amount of polymer can typically be, for example, 1-20% by mass. Typically, a polymer amount of about 2-10% by mass is, however, enough for producing a sufficient conductivity for the layer. As polymer can be used a polymer conductive as such or a polymer doped in order to produce charge carriers (ICP, inherently conductive polymer). Dispersion of polyaniline (PA) and dodecylbenzensulphonacid (DBSA) is mentioned as an example, in which DBSA acts as the doping substance. In this case cationic starch is a suitable binder. One example of such a method is described in reference [1], the contents of which are appended herein as a reference. The fibers can also be treated so as to be conductive by polymerizing certain conductive polymers in the vicinity of the fibers, whereby they are polymerized on the surface of the fiber.

Alternatively, the already dry or partly still wet fiber layer (or other porous substrate) can be saturated so as to be conductive by impregnating it with conductive material. This brings about a similar end result as the method in which conductive material is mixed already into the fiber pulp. Care must, however, be taken so as not to block the pores of the fiber layer, thereby decreasing the performance of the filter. Depending on the method used for producing conductive layers the layering can be carried out with a number of alternative ways.

The isolation layer 12 and the conductive layers 14, 16 can be bound to each other with an online-method using wet or dry layering techniques or in a separate process. In case binders, such as glue, are used for producing sufficient adhesion, it must be ensured that the application thereof does not essentially reduce the air permeability of the structure. The advantage of wet webbing (wet layering) is that no binders are needed for binding the layers. Thus, a multi-web paper machine can preferably be used.

The advantages of the layering method are, for example, its suitability for mass production and the fact that the air permeability of the conductive layers is high, often in the same level with the isolation layer. Such conductive layers can also effectively participate in the filtering as well.

The layer thicknesses can be widely varied. The conductive layers 14, 16 can form, for example, 5-90% of the total thickness of the material 10. In a typical solution, however, the thickness of the conductive layers 14, 16 is 20-100% of the thickness of the middle layer 12.

The above-mentioned methods can be combined as well. For example, both sides of the isolation layer need not be similarly treated. For example, in order to achieve good air permeability and, on the other hand, good tensile strength, different methods can be used for forming both conductive layers.

A common feature of the above-mentioned filter structures is that the conductive material is bound into an existing porous material structure or particles that at a later stage form a porous material structure, and the conductive layers 14, 16 therefore are not totally formed by conductive material. Typically, the binding of the substrate fibers into each other mainly determines the mechanical properties of the conductive layers, whereas the properties, amount and distribution of the conductive material arranged on the surface of the fibers of the matrix determine the electrical properties of the layer.

In case it is not desired to use the conductive layers for filtering, they are either produced to be thin and/or with low density (high porosity), whereby their application reduces the air permeability of the product as little as possible (for example, less than 50%, especially less than 20%). In a typical solution the porosity of the conductive layers is of the same magnitude as the isolation layer, but their thickness is smaller. On the other hand, in case the conductive layers are meant to effectively participate in the actual filtering, they can also be thicker and/or more dense.

Polyaniline is well suited for use as a conductive material. In aniline polymer the monomer is aniline or its derivative, the nitrogen atom of which is mainly bound to the carbon of the para station of the benzene ring of the next unit. Unsubstituted aniline can occur in a number of forms, of which the most common in conductive polymer applications is the so-called emeraldine form.

The electrically conductive polymer can comprise an inherently conductive polymer, ICP, that has been doped (i.e. mixed, treated) for creating charge carriers (openings and electrons). Conjugated main chain double bindings (alternating single and double bindings, delocalized silicon-electron system) making the movements of charge carriers possible are common to all electrically conductive polymers. Electrically conductive polymers typically have both ionic and electronic conductivity which can be utilized in some applications. The conductivity of the electrically conductive polymers can be adjustably variable within the range between isolation . . . metallic conductivity.

The electrically conductive polymer can be bound to the support matrix in both an electrically conductive and electrically non-conductive form. Because of this, with the term "conductive material" is here meant a polymer non-conductive at the time of observation that can, however, be turned into an electrically conductive state by means of, for example, suitable doping substance treatment. Typically the doping substances contain inorganic and inorganic and organic acids as well as their derivatives, examples of which include mineral acids HCl, $H_2SO_4$, $HNO_3$, $HClO_4$, $HBF_4$, $HPF_6$, HF, phosphoric acids, sulphon acids, picric acid, n-nitrobenzen acid, dichlorine aceto acid and polymer acids. Preferably a functional acid is used for doping, such as sulphon acid, especially aromatic sulphon acid (TSA). DBSA and TSA and especially well suited for doping polyaniline into conductive polyaniline complex. If desired, more than one doping acid can be used.

The metal particles or carbon black are typically bound to the fibers by a binder, preferably by gluing. Thus their use, like that of polymers, is possible in all above-mentioned methods.

During the use of the filter, a relatively large voltage is preferably created between the conductive layers while ensuring that there is no risk of breakdown even in the vicinity of voltage application points or areas. Depending on the application and the thickness of the isolation the voltage can vary in the range of 100 V-3 kV. If necessary, locally polymeric or metallic terminal areas can be arranged in the conductive layers for easily and reliably connecting to the voltage source. This also ensures easy changeability of disposable filters.

According to a preferred embodiment air flow is directed to the vicinity of a corona wire 18 prior to directing it through the filter paper for electrically charging the particles entrained with the air flow. Use of such pre-chargers is known from traditional electric filtering applications.

FIG. 2 is a graphical illustration of the particle separation efficiency of an electrically charged filter paper according to one embodiment of the invention in comparison with the particle separation efficiency of the same filter when the electric field charging the particles is not on. The effect of the pre-charger on filtering efficiency is also shown. These graphs clearly show that for very small particles (diameter 1 μm) the separation efficiency is increased from 40 percent to 90 percent by means of the invention. A very large positive effect could be seen for small particles, 0.1-2 μm in size. The pressure loss in the test was 97 Pa. When using only the pre-charger and uncharged paper, the filtering efficiency does hardly get any better. In later experiments, filtering efficiencies as high as 100% have been achieved. Simultaneously also the pressure loss has been reduced.

The disclosed filter material can be folded or creased for increasing the effective area of the filter. The material can also be folded for creating a multi-layer filter; even so that the various layers are in direct contact with each other. In this case electric fields with opposite directions effect the air flow in subsequent filter layers.

Even though in the above-mentioned examples mainly disclose fiber-based filters, the same principles can be used for other porous material types suitable for filtering, such as ceramic materials or open cell plastics.

REFERENCE

[1] Kaukoniemi, O-V., Kiri, K., Valkama, J., Mäkelä, T. and Laine, J. E.: Combining polyaniline and sulphate pulp for antistatic paper. Proceedings of the 2004 Progress In Paper Physics seminar, Jun. 21-24, Trondheim, Norway, p. 101-103.

We claim:

1. A filter structure for filtering a particle-containing gas, the filter structure comprising a planar porous isolation material layer having two opposing surfaces, and a porous conductive layer attached to both surfaces of the isolation material layer, the conductive layer comprising a porous support matrix treated with a conductive material different from the material of the support matrix so as to be conductive, wherein the conductive material is inherently conductive polymer.

2. A filter structure according to claim 1, wherein the isolation material layer is a fiber layer.

3. A method according to claim 2, wherein the fiber layer is paper, glass fiber layer or fabric.

4. A filter structure according to claim 1, wherein the conductive layers are fixedly attached to the isolation material layer.

5. A filter structure according to claim 1, wherein the inherently conductive polymer is polyaniline, polypyrrole, polyacetylene, polytiophene or polyparaphenylene or a mixture thereof.

6. A filter structure according to claim 1, wherein both conductive layers are uniform and essentially homogenously conductive.

7. A filter structure according to claim 1, wherein the conductive layers are attached to the isolation material layer without binders.

8. A filter structure according to claim 1, wherein the porous support matrix is a fiber matrix, the conductive material being bound to the surface of the fibers for electrically connecting fibers to each other.

9. A filter structure according to claim 1, wherein the conductive layers are essentially similar.

10. A filter structure according to claim 1, having air permeability of at least 100 l/(m²s).

11. A filter structure according to claim 10, wherein the air permeability is about 1000-8000 l/(m²s).

12. A filter structure according to claim 1, wherein the thickness of the isolation layer is 0.05-2 mm.

13. A filter structure according to claim 12, wherein the thickness of the isolation layer is 0.1-1 mm.

14. A filter structure according to claim 1, wherein the mechanical separation efficiency of the isolation material layer for 1 μm particles is 20-99%.

15. A filter structure according to claim 14, wherein the mechanical separation efficiency of the isolation material layer for 1 μm particles is 40-80%.

16. A filter structure according to claim 15, wherein the mechanical separation efficiency of the isolation material layer for 1 μm particles is at least 50%.

17. A method of filtering a particle-containing gas, in which method gas is directed through a porous isolation material layer for separating particles entrained therein, wherein in the porous isolation material layer the gas is subjected to an electrical field caused by means of a voltage directed to parallel porous conductive layers located on opposing sides of the isolation material layer, the conductive layers comprising a porous support matrix treated with a conductive material different from the material of the support matrix so as to be conductive, and wherein inherently conductive polymer is used as said conductive material.

18. A method according to claim 17, wherein a voltage of 100 V-3 kV is used.

19. A method according to claim 17, wherein prior to directing the gas into the isolation material the particles entrained therewith are charged by means of a pre-charger.

20. A method according to claim 19, wherein the pre-charger is a corona wire.

21. A method of producing a gas filter structure, comprising
providing a porous isolation substrate having two opposing surfaces,
attaching conductive layers to both surfaces of the isolation substrate, the conductive layers comprising a porous support matrix treated with conductive material, and
using a conductive material different from the material of the support matrix, wherein inherently conductive polymer is used as said conductive material.

22. A method according to claim 21, wherein a fiber substrate is used as isolation substrate.

23. A method according to claim 22, wherein the fiber substrate is paper, glass fiber or fabric.

24. A method according to claim 21, wherein the conductive material comprises inherently conductive polymer.

25. A method according to claim 24, wherein the inherently conductive polymer is selected from the group consisting of polyaniline, polypyrrole, polyacetylene, polytiophene or polyparaphenylene and a mixture thereof.

26. A method according to claim 21, wherein the conductive layers are attached to the surfaces of the isolation substrate by means of wet layering.

27. A method according to claim 21, wherein at least one conductive material layer is formed by binding conductive material to the fibers of the support matrix.

28. A method according to claim 21, wherein at least one conductive layer is formed by mixing conductive material into a fiber pulp for binding the conductive material with the fibers and for removing moisture from the pulp for forming a conductive layer.

* * * * *